Oct. 3, 1961     B. W. ROTH ET AL     3,002,557
SCREEN AND FRAME ASSEMBLY
Filed Oct. 2, 1958               3 Sheets-Sheet 1
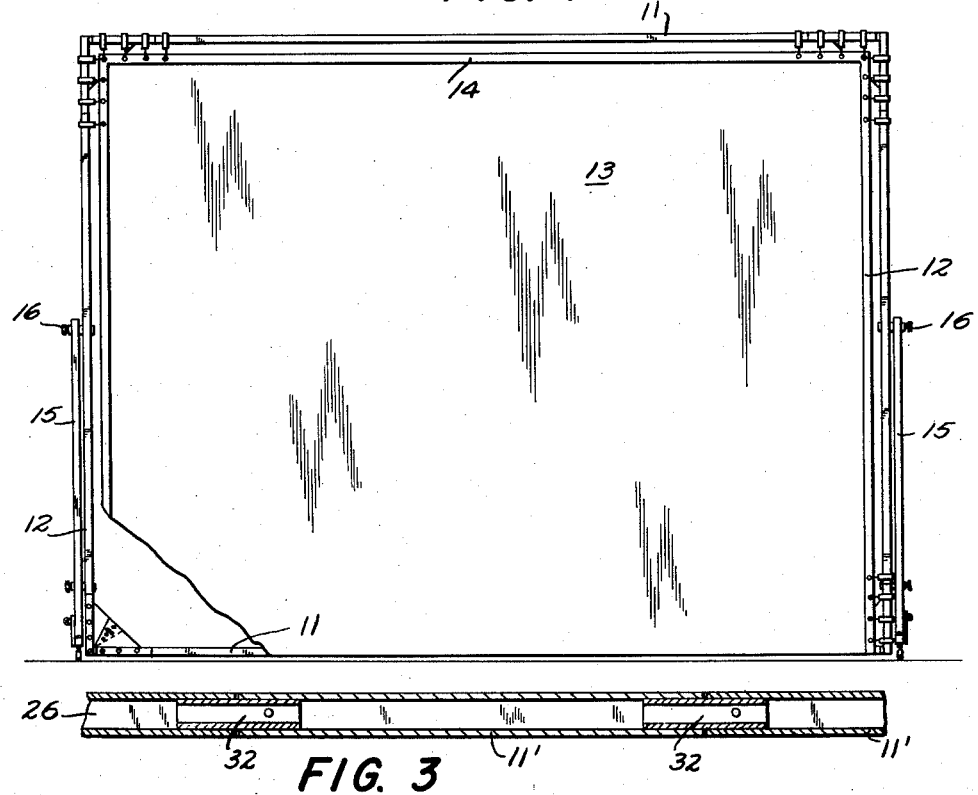
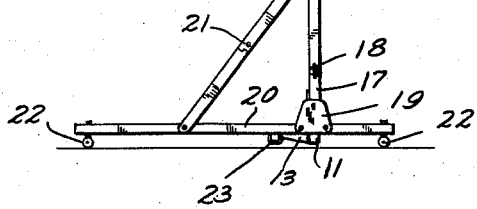
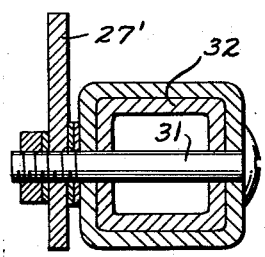
INVENTORS.
BERT W. ROTH
RICHARD FRAMPTON
BY
Kane, Dalsimer and Kane
ATTORNEYS

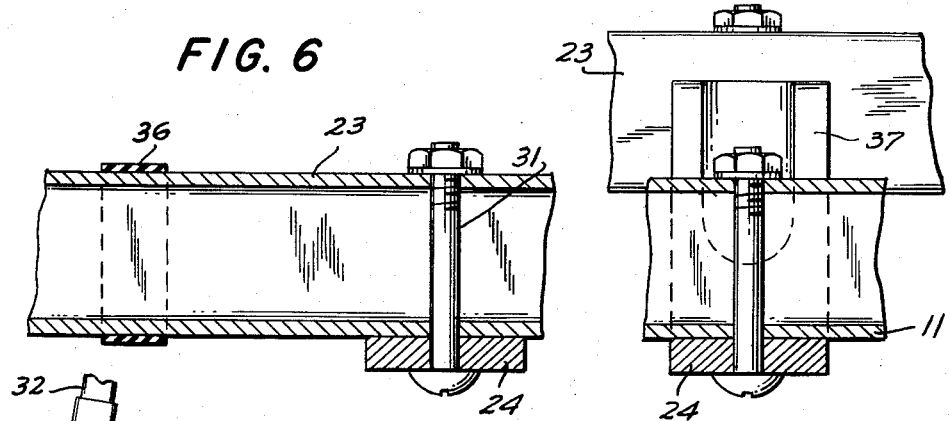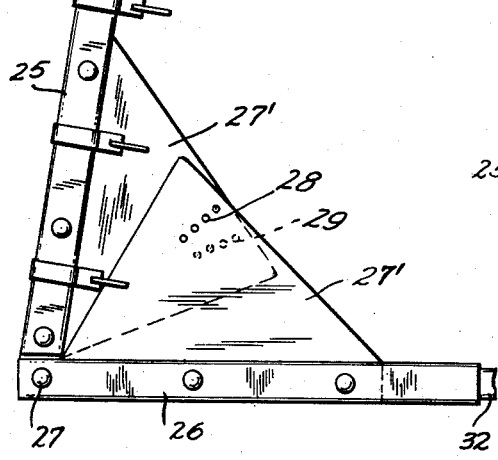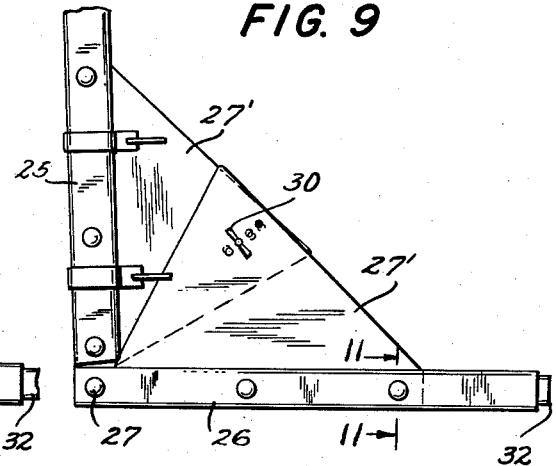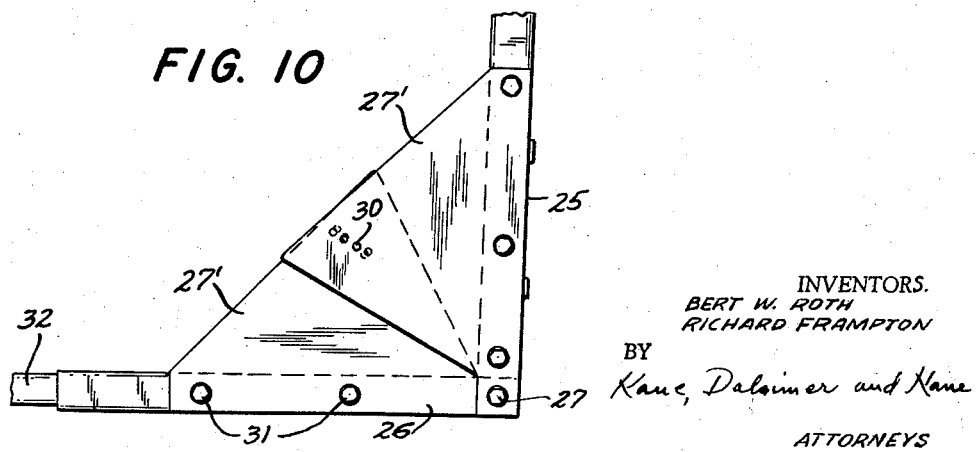

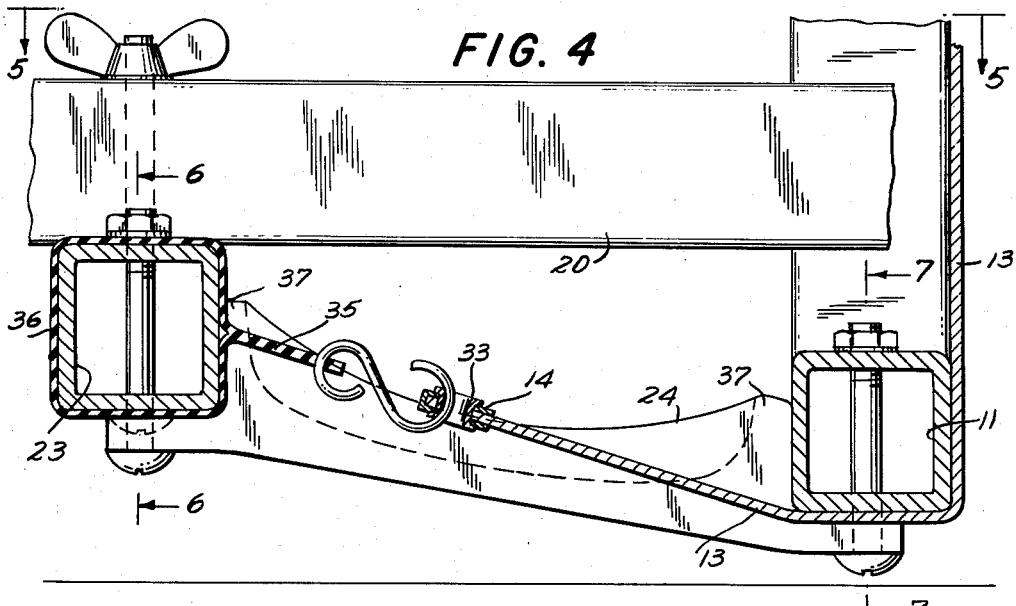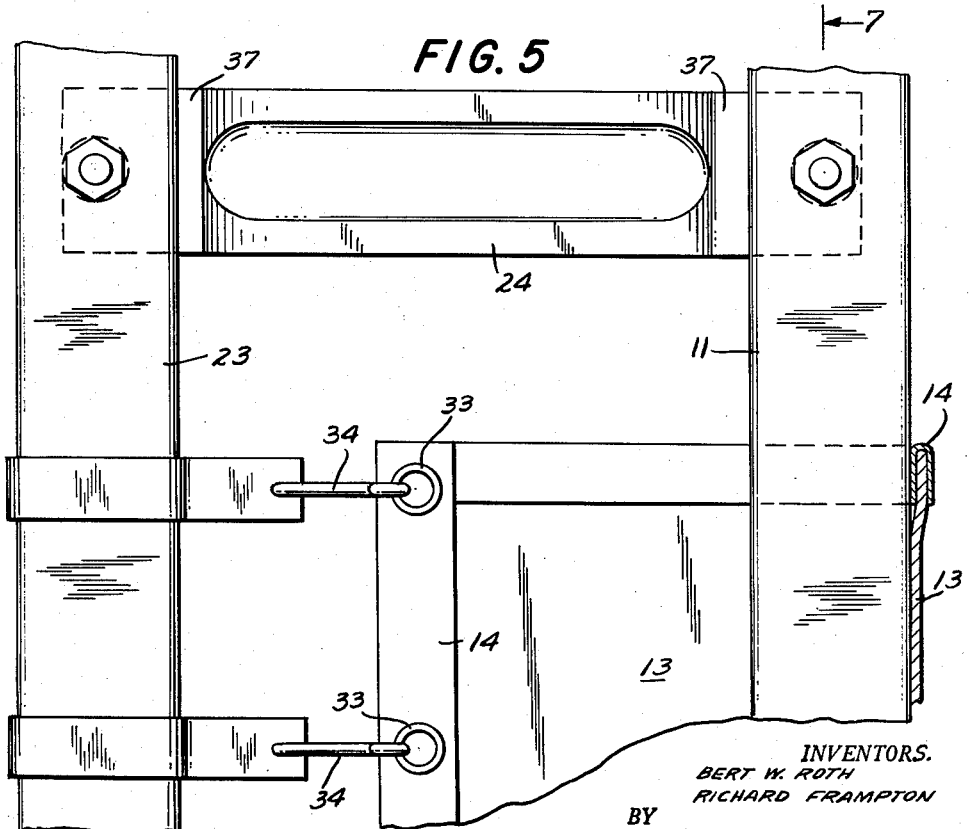

3,002,557
SCREEN AND FRAME ASSEMBLY
Bert W. Roth, New Rochelle, and Richard Frampton, Malverne, N.Y., assignors to Trans-Lux Corporation, New York, N.Y., a corporation of Delaware
Filed Oct. 2, 1958, Ser. No. 764,984
3 Claims. (Cl. 160—351)

This invention relates to a structurally and functionally improved screen assembly which may be advantageously employed in numerous different associations, but which will be of particular value when used to receive light images defined thereon by still and motion picture projectors, so that a "background" scene may be defined in, for example, a television studio.

By means of the present teachings, an assembly is furnished in which the screen will be maintained in properly extended condition, free from wrinkles or other defects; the use of the improved structure assuring that the screen will be properly taut and maintained in this condition irrespective of the area of that screen.

A further object is that of providing a screen assembly which may be "set up" by relatively unskilled labor, and so that properly defined light images may be created thereon regardless of whether a small or a large background screen is being provided.

Still another object is that of designing a screen in which several components may readily be grouped in proper fashion with respect to each other to furnish a frame suitable for use with large, medium or small screens, and in which the structure may be rapidly disassembled for storage and shipment when it is desirable to do so.

With these and other objects in mind, reference is had to the attached sheets of drawings illustrating one practical embodiment of the invention and in which:

FIG. 1 is a partly fragmentary front view of a screen;
FIG. 2 is a similar side elevation of the assembly;
FIG. 3 is a sectional side view in slightly enlarged scale of the components of one of the frame members, coupled to each other;
FIG. 4 is a transverse sectional view in enlarged scale showing in section a preferred arrangement of the assembly adjacent the lower frame member;
FIG. 5 is a sectional plan view taken along the line 5—5 in the direction of the arrows as indicated in FIG. 4;
FIGS. 6 and 7 are fragmentary transverse sectional views taken respectively along the lines 6—6 and 7—7 in the direction of the arrows as indicated in FIG. 4;
FIGS. 8, 9 and 10 are views showing various positions to which the parts of the corner units of the frame may be adjusted; and
FIG. 11 is a transverse sectional view in enlarged scale taken along the line 11—11 in the direction of the arrows as indicated in FIG. 9.

Referring primarily to FIGS. 1 and 2, the screen frame includes horizontally and vertically extending supporting members 11 and 12 defining a frame. Within the latter a screen body 13 is disposed. That body is preferably formed with a marginally reinforced zone 14 which assists in the supporting of the screen by the frame. The details of this support, as well as the preferred design of the supporting members, will hereinafter be described.

The frame assembly may include merely the foregoing components, plus corner pieces which will maintain the screen body in properly taut condition, plus some mounting expedient. In most instances it is desired to have the frame of a mobile character. To this end, a dolly structure is conveniently associated with the frame and may include vertically extending supports 15 secured adjacent their upper ends by clamps 16 to the side members 12 of the frame. The base portions of the supports 15 may be defined by tubular members 17, again attached by suitable clamps 18, or otherwise, to the frame assembly adjacent the lower ends of the vertical supporting members 12. Parts 17 are secured in any desirable manner to plates 19 mounted by horizontally extending supports 20. The vertically extending structures above these supports may be braced by hingedly coupled straps 21 secured at their upper ends to the supports 15 and at their lower ends to members 20 at points rearwardly of the main frame. Casters or wheels 22 lie below the members 20, so that the entire assembly will be mobile.

Having in mind that the present structure is especially intended for use in television studios to provide proper backgrounds, and also having in mind that the light images projected on the screen will emanate from a projector disposed rearwardly of the screen, it is preferred that the screen extend substantially adjacent the supporting floor. Therefore, as shown in FIG. 2 and in FIGS. 4 and 5, screen 13 should preferably have a height such that it will extend around the outer surfaces of the lowermost supporting member or assembly 11, and be connected to a rearwardly disposed supporting member 23. A spacing element or bracket 24 is conveniently interposed between and connected to members 23 and 11 at the lower end of the assembly. Any suitable number of these brackets may be thus employed. As will be apparent, with such a construction, light images defined upon the screen and emanating from a projector rearwardly of the same will have their lower margins appearing adjacent the floor surface. Therefore, it will be unnecessary either to disguise the gap which would otherwise exist between the floor and the lower zone of the screen, or to elevate actors in advance of that screen upon a platform above the lower horizontal supporting member 11 of the assembly.

Corner pieces or units serve to connect the adjacent ends of the horizontal frame members 11 with the vertical frame members 12. These corner pieces, as shown in FIGS. 8, 9 and 10, include preferably hollow tubular members 25 and 26 pivotally connected at their adjacent ends by means of a bolt 27 or any other suitable coupling structure. Plates 27', preferably of triangular configuration, are secured one to each of members 25 and 26. The adjacent edges of these plates overlap each other, for which reason each of these plates preferably has its base edge and the edge extending from the corner defined by members 25 and 26 lying at angles in excess of 45° with respect to each other. Curved rows of openings 28 and 29 are formed in the different plates 27'. When the members 25 and 26 are disposed at right angles to each other, these rows will diverge, as clearly shown in FIG. 9.

The individual openings of rows 28 and 29 may be aligned with each other by swinging supporting members 25 and 26 from the position shown in FIG. 8 to that illustrated in FIG. 9 and beyond the latter position.

When so aligned, a bolt and wing nut assembly 30 may be extended through the openings and tightened. Under these circumstances, members 25 and 26 will extend at obtuse angles with respect to each other. Conveniently, bolt and nut assemblies 31 secure plates 27' against movement with respect to members 25 and 26. Similar bolt and nut assemblies may provide the pivots 27 for pivotally coupling these members to each other.

The reason for having the corner units embrace an adjustable construction such that the horizontal and vertical supporting members 11 and 12 may in each instance extend at an obtuse angle with respect to each other is that these supporting members, with the screen under proper tension, will tend to sag or bend. This would be true unless members 11 and 12 were made of such heavy stock as to be completely unwieldy. When members such as these do flex or bend, then it is apparent that the screen will not be supported in properly taut condition, free from any wrinkles or other objectionable characteristics. By having the elements 25 and 26 extend in directions defining an angle greater than a right angle, then, despite the fact that members 11 and 12 may be of relatively light stock, those members will not sag or flex under screen tension, so that the screen will embody objectionable characteristics. Rather, members 11 and 12 will have, under initial conditions, a slight outward bow. With the screen mounted in position and exerting the tension on these members which will inevitably result, they will be flattened, so that throughout the major portion of their length they will extend in substantially straight lines, with the major zones of the different members lying substantially at right angles to each other.

According to a preferred concept of this invention, it is intended that the horizontal members 11, vertical members 12 and the corner units be formed of different parts. Those parts may conveniently each include metallic tube portions rectangular in section, as shown especially in FIGS. 4 and 11, and which slidably ensleeve smaller tubular sections 32 serving as dowels. These parts may be secured against axial shifting with respect to each other by providing them with openings alignable to receive bolt assemblies similar to the assembly illustrated in FIG. 11. In FIG. 3 there has been somewhat schematically illustrated one end of tubular member 26 and sections 11' providing member 11. These sections are coupled by dowel pieces 32, as illustrated in this figure. It is apparent that with reasonable tolerance existing between the parts, the sagging condition afore described will be greatly emphasized when the screen is coupled to the frame under proper tension.

Obviously, by thus providing sectional assemblies, it will be feasible for an operator to quickly group together parts such that frames are furnished which will be of diverse sizes to mount screens of different areas. For example, each of sections 11' may have an over-all length of around 3'. The members 25 and 26 providing the corner units may each have a length of slightly in excess of 1'. Therefore, by grouping together three sections 11' by means of dowel pieces and bolts, and inserting the ends of these sections one into each of the members 26 of the corner units, an overall length in excess of 12' may be achieved. By resorting to similar procedures, a desired height of frame may be produced. With the parts being of proper length, that frame will properly mount a 9' by 12' screen 13. By simply adding one section 11' to each of the upper and lower units 11 of the frame, and a corresponding section to each of the vertically extending members 12 of that frame, a screen of, for example, 15' by 12' may be properly supported.

Now, to connect the screen to these vertical and horizontal supporting members, it is preferred to employ a quickly detachable coupling assembly. This will conveniently embrace grommets 33 secured against movement within the marginally reinforced zone 14 of the screen and engaged by the free ends of hook elements 34. Those hook elements, as shown particularly in FIG. 4, may have their shank portions substantially permanently secured to the tab parts 35 of rubber loops 36 encircling adjacent supporting members. It is obvious that the marginal zones of the screen may thus be quickly secured to supporting portions or members adjacent the same, and likewise readily uncoupled from those supporting portions when desired. In the event that the screen does not have to pass below the lower horizontal supporting member 11, as in FIG. 4, then member 23 may be dispensed with, and the loops 36 may be directly associated with member 11.

It is apparent that as desired or necessary, the bolt and nut assemblies 31 may have associated with them suitable lock washers, as in FIGS. 4 and 5, in addition to spacing washers, as shown in FIG. 11. Also, if the designer prefers an assembly not requiring the use of wrenches, then in lieu of conventional nuts, wing nuts, as indicated at 30, may be employed. The ends of the strap 24 conveniently terminate in foot or bearing portions 37, as illustrated in FIGS. 4, 5 and 7, to assure against undesired movements with respect to the elements, thereby providing an inherently stable structure. If the dolly assembly, as illustrated in FIGS. 1 and 2, is unnecessary, then it may be discarded, and suitable foot portions may define the lower end of the frame, if such portions are found to be necessary.

As will be apparent, the greater the length of the horizontally and vertically extending supporting members, the greater will be the tendency of these members to sag when made of material of acceptable gauge and supporting a screen. The series of openings 28 and 29 may be employed as registering marks compensating for any such sagging tendency, according to the area of the screen. For example, with four each of these openings, an alignment of that pair which are closest to the pivot 27 may provide a frame structure suitable for supporting an 9' by 10' screen. The aligning of the next outermost pair of openings may similarly furnish a mounting for a 9' by 12' screen, the next pair of openings receiving the bolt assembly 30 in the case of a 10' by 14' screen, and the final pair of these openings serving to receive the coupling element when a 13' by 18' screen is employed. In other words, an increasingly obtuse angle will be defined by members 25 and 26 under this series of adjustments. This increase in angularity will in effect be neutralized by the increased sagging or flexure of members 11 and 12 when mounting screens of progressively larger areas, with a consequent increase in leverage, as well as in the number of tensioning loops. It will be found in connection with this structure that the different-sized screens will be adequately and properly supported, so as to define a generally rectangular configuration, with the opposite vertical members 12 and horizontal members 11 extending generally parallel to each other.

Thus, among others, the several objects of the invention as specifically aforenoted are achieved. Obviously, numerous changes in construction and rearrangements of the parts may be resorted to without departing from the spirit of the invention as defined by the claims.

We claim:
1. A screen and frame assembly, said frame comprising horizontally and vertically extending members having a tendency to flex when subjected to stress, corner pieces comprising elements pivotally connected to each other and coupled to said members, plates secured one to each of said elements and extending toward each other to have a zone of overlapping, said plates being each formed with a plurality of openings within said zone of overlapping, means extensible through aligned openings of the different plates for retaining the latter and said elements against relative movements, a screen of substantially rectangular outline surrounded by said members and corner pieces, means yieldingly connecting said members and the adjacent screen edges to place such screen under tension and accordingly place said members under stress such that they flex and bow toward each other through their central zones, the openings in the different plates successively aligning as said elements are swung from positions defining less than a right angle to positions defining an angle greater than a right angle; the portions of the members adjacent said elements in the latter position likewise extending with respect to each other to define an angle greater than a right angle and thus maintaining all edge zones of said screen under substantially equal tension despite the flexing of said members.

2. In an assembly as defined in claim 1, the arrangement of the openings formed in the different plates embracing a pattern such that they extend in rows outwardly from the pivot connecting the elements and with the other openings in the different plates being out of registry with each other when a pair of those openings are aligned.

3. In an assembly as defined in claim 1, a supporting member disposed rearwardly of, parallel to and above a lower one of said horizontally extending members, and a spacing and supporting bracket interposed between such lower member and the supporting member extending parallel thereto.

References Cited in the file of this patent

UNITED STATES PATENTS

| | | |
|---|---|---|
| 855,354 | Soucey | May 28, 1907 |
| 1,631,621 | Carrigan | June 7, 1927 |
| 1,737,947 | Rynearson | Dec. 3, 1929 |
| 1,760,612 | Trott | May 27, 1930 |
| 2,470,416 | Silver | May 17, 1949 |
| 2,571,382 | Raven | Oct. 16, 1951 |
| 2,693,230 | Burks | Nov. 2, 1954 |
| 2,699,705 | Csvercsko et al. | Jan. 18, 1955 |
| 2,727,753 | Johnson et al. | Dec. 20, 1955 |

FOREIGN PATENTS

| | | |
|---|---|---|
| 20,302 | Great Britain | Nov. 23, 1891 |